Nov. 12, 1968  J. L. MARTIN  3,410,065
HARVESTER FOR ALFALFA AND OTHER FORAGE CROPS
Filed April 12, 1966  5 Sheets-Sheet 1
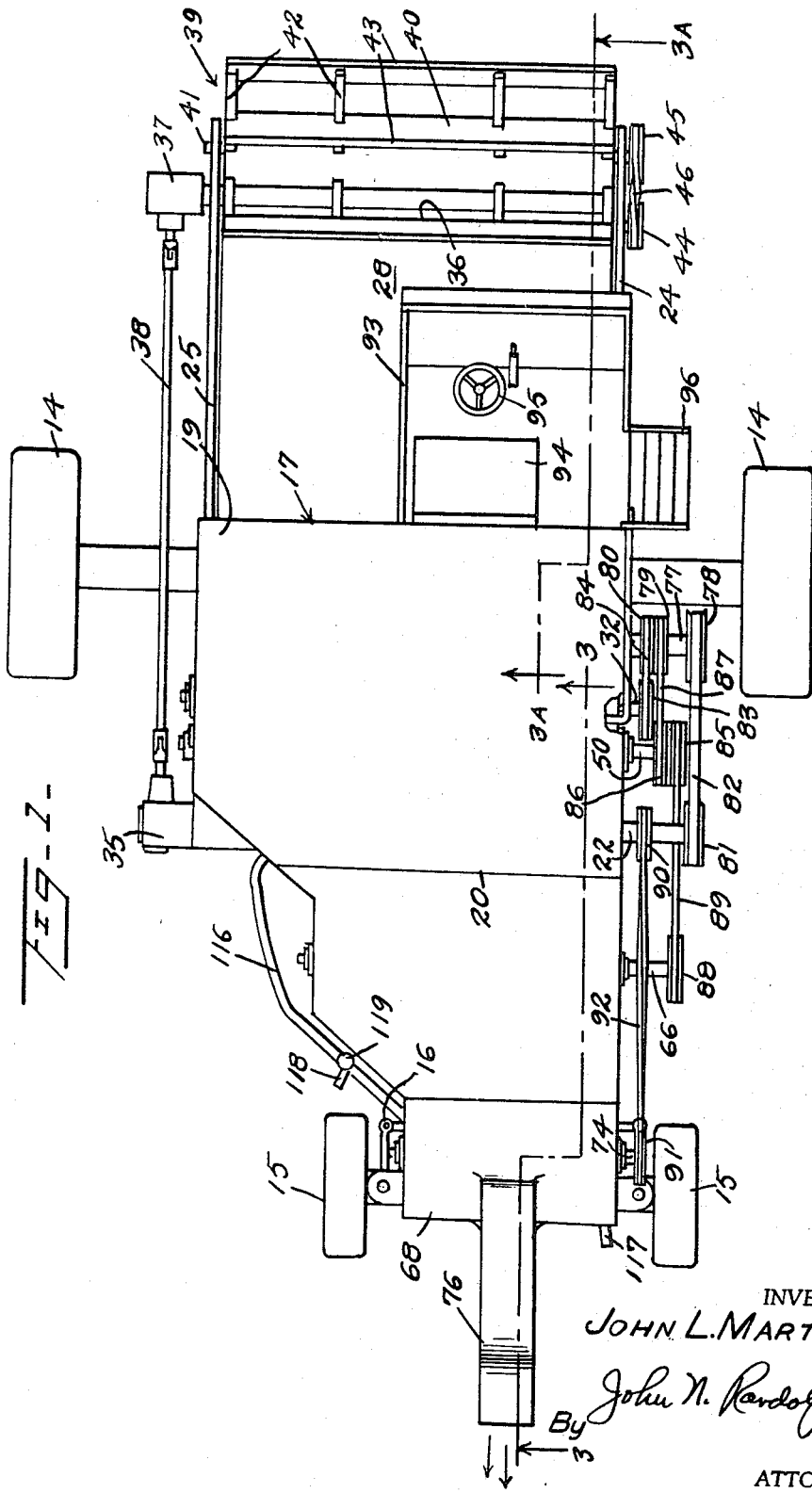
INVENTOR
JOHN L. MARTIN
By John N. Randolph
ATTORNEY Nov. 12, 1968   J. L. MARTIN   3,410,065
HARVESTER FOR ALFALFA AND OTHER FORAGE CROPS
Filed April 12, 1966   5 Sheets-Sheet 2
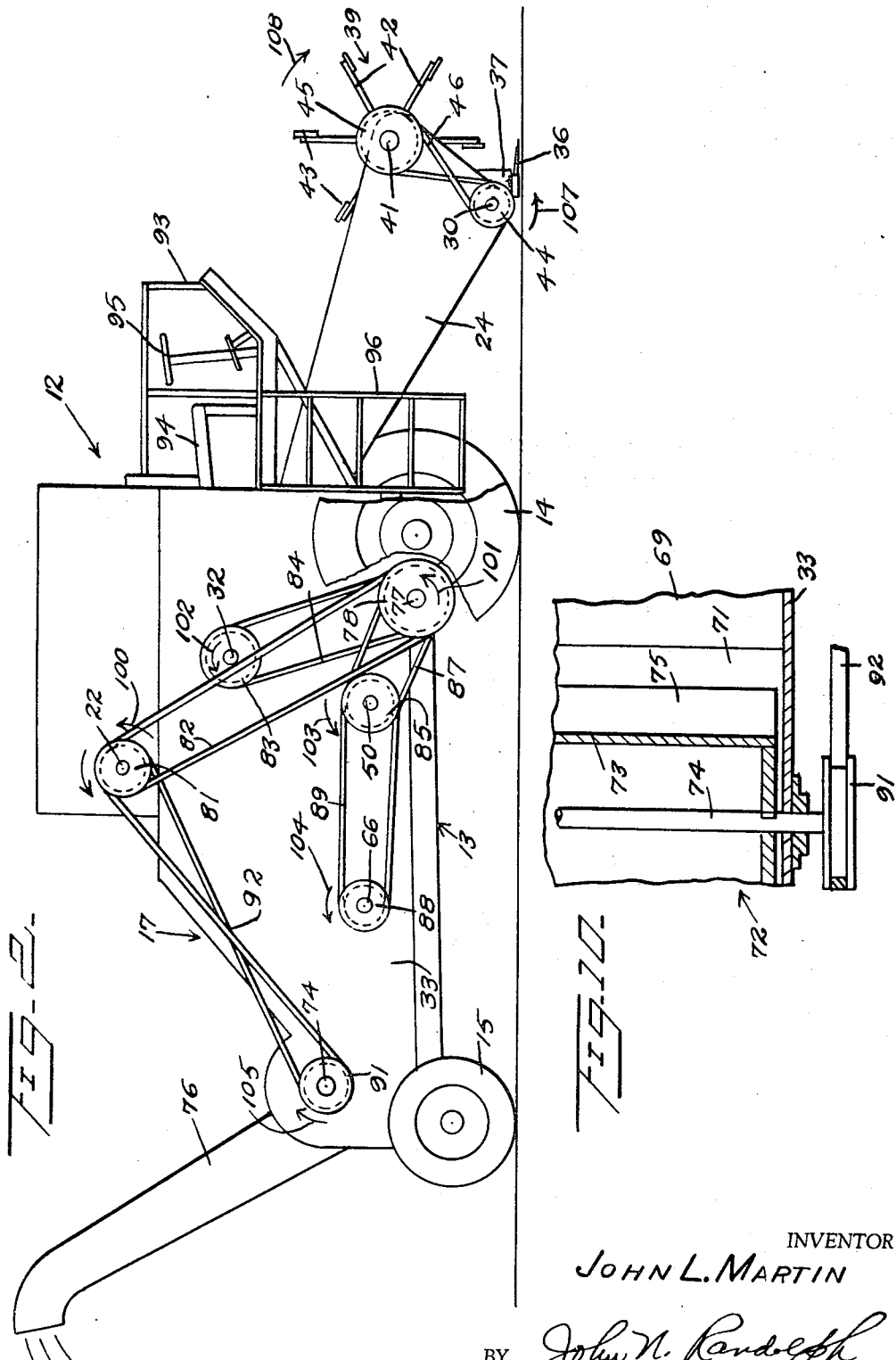
INVENTOR
JOHN L. MARTIN
BY John N. Randolph
ATTORNEY

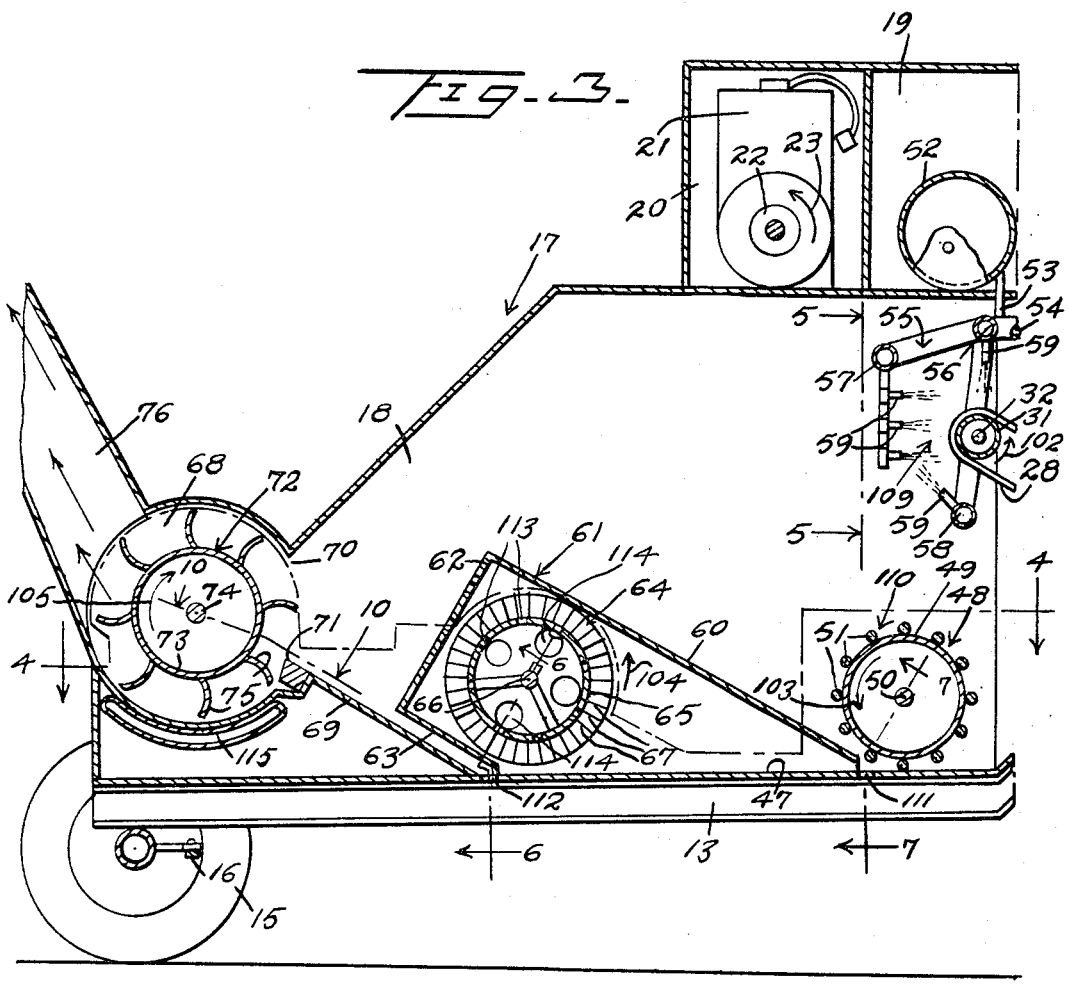
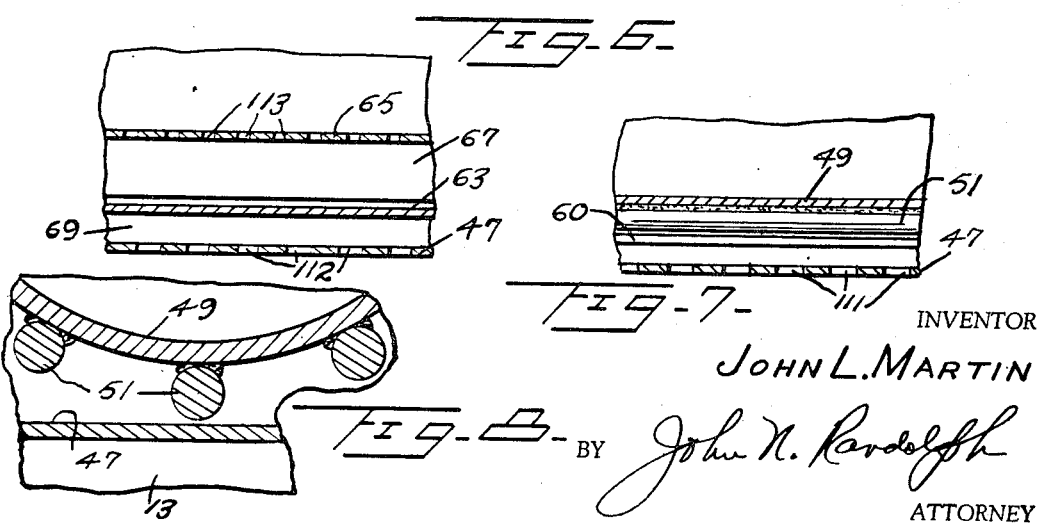

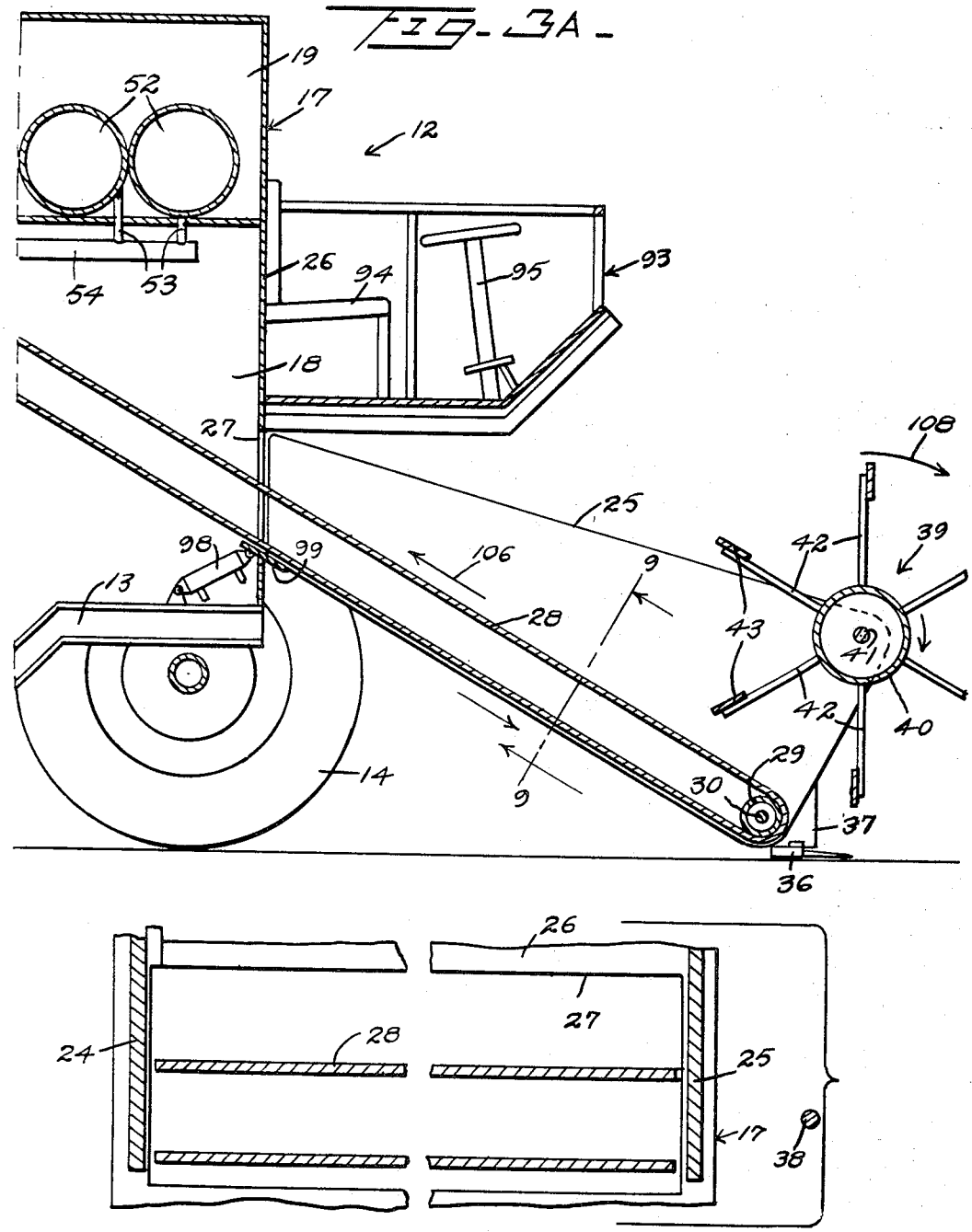

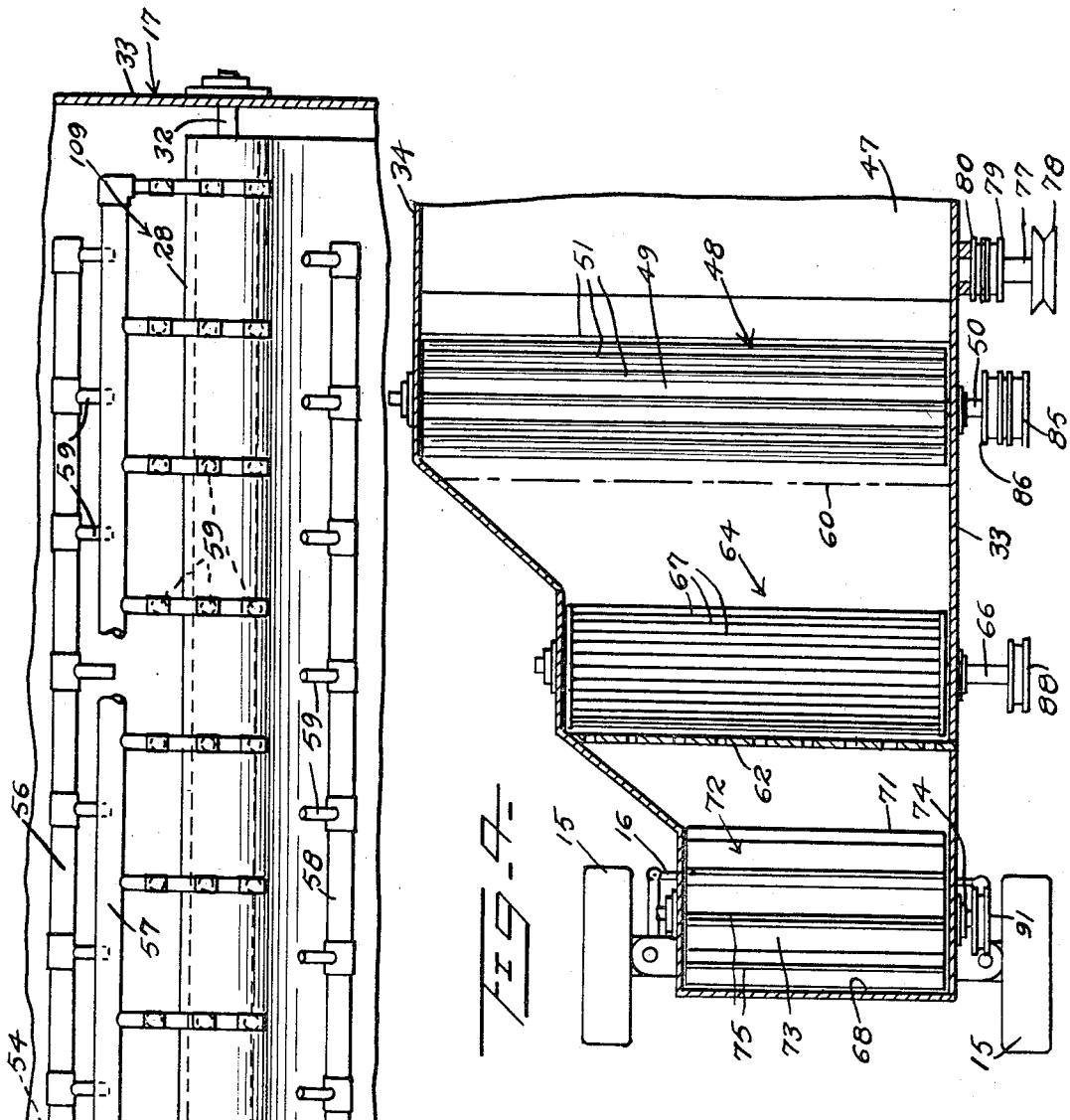

United States Patent Office 3,410,065
Patented Nov. 12, 1968

3,410,065
HARVESTER FOR ALFALFA AND OTHER FORAGE CROPS
John L. Martin, 1010 Pearl Ave.,
Modesto, Calif. 95350
Filed Apr. 12, 1966, Ser. No. 542,039
7 Claims. (Cl. 56—23)

This invention relates to a machine for harvesting alfalfa and other forage crops and has for a primary object to provide a machine through the use of which harvesting of forage crops can be accomplished much more rapidly and as a single operation.

Alfalfa, for example, when prepared as silage should possess a moisture content of between 40% and 45%, between 18% and 20% as wafers of hay, and between 12% and 15% as chopped dry hay. In order to accomplish this utilizing conventional equipment and methods, it is necessary to mow, rake or swath and allow the material to lay in a windrow to be air dried until the desired moisture content is obtained. This may involve anywhere from a few hours to several days depending upon the climate and weather conditions. Thereafter, the dried forage material is usually picked up by a field chopper, chopped and blown into a conveyance to be hauled to storage.

It is an object of the present invention to provide a machine by the use of which the aforementioned waiting period may be eliminated so that the cutting, raking or swathing and chopping operations may all be accomplished successively and without interruption as the machine moves through the field containing the forage crop.

A further and primary object of the invention is to provide a machine containing means for quickly freezing forage material during the harvesting operation to effect an extraction of the moisture from the alfalfa or other forage materials through condensation due to ice formation on the forage materials in the form of ice crystals on the exterior thereof. This ice formation renders the alfalfa or forage material very brittle so that the ice may be removed readily from the plants by a beating operation to substantially reduce the moisture content of the material. The forage material is ready to be conveyed to a chopper and blower section of the machine in which the dried material is cut to a desired fineness and thereafter blown from the machine ready to be hauled to storage or to be handled by any one of the present packaging operations.

Various other objects and advantages of the invention will hereinafter become more fully apparent from the following description of the drawings, illustrating a presently preferred embodiment thereof, and wherein:

FIGURE 1 is a top plan view of a machine constructed in accordance with the invention;

FIGURE 2 is a side elevational view thereof, partly broken away;

FIGURE 3 is an enlarged fragmentary longitudinal vertical sectional view of approximately the rear half of the machine, taken along the line 3—3 of FIGURE 1;

FIGURE 3A is a similar view of approximately the forward half of the machine, taken substantially along the line 3A—3A of FIGURE 1;

FIGURE 4 is a fragmentary horizontal sectional view, on a reduced scale, taken substantially along the line 4—4 of FIGURE 3;

FIGURE 5 is an enlarged fragmentary transverse vertical sectional view, taken substantially along a plane as indicated by the line 5—5 of FIGURE 3;

FIGURE 6 is an enlarged fragmentary transverse vertical sectional view, taken substantially along the line 6—6 of FIGURE 3;

FIGURE 7 is an enlarged fragmentary transverse vertical sectional view, taken substantially along the line 7—7 of FIGURE 3;

FIGURE 8 is an enlarged detailed sectional view of a portion of the beater as seen in FIGURE 3;

FIGURE 9 is a fragmentary cross sectional view, taken substantially along a plane as indicated by the line 9—9 of FIGURE 3A; and FIGURE 10 is a fragmentary sectional view taken substantially along the line 10—10 of FIGURE 3.

Referring more specifically to the drawings, the harvester in its entirety is designated generally 12 and includes a frame 13 supported by a pair of transversely aligned front wheels 14 and a pair of transversely aligned rear wheels 15. Conventional means 16 (FIGURES 3 and 4) is provided to enable the rear wheels 15 to be steered for guiding the machine 12. A casing, designated generally 17, is supported on and rises from the frame 13.

The casing 17 includes a large lower compartment 18 which extends from end-to-end of the frame 13 and smaller upper compartments 19 and 20. The rear upper compartment 20 contains a prime mover 21, preferably an internal combustion engine, having a driveshaft 22 which rotates in the direction as indicated by the arrow 23 (FIGURE 3) which driveshaft projects outwardly from opposite sides of the casing 17.

A pair of walls 24 and 25 extend forwardly and downwardly from the front wall 26 of the casing 17 and are disposed in spaced apart substantially parallel relationship to one another and in substantially vertical planes. The wall 26 is provided with an opening 27 (FIGURES 3A and 9) which extends between the walls 24 and 25 and which opens into the forward end of the lower chamber 18.

An endless conveyor belt 28 extends through the opening 27 and between the walls 24 and 25. The forward end of the belt 28 is trained over a pulley 29, the shaft 30 of which extends through and is journaled in the front lower corners of the walls 24 and 25. The rear end of the belt 28, which is disposed in the chamber 18, is trained over a pulley 31, the shaft 32 of which extends through and is journaled in the side walls 33 and 34 of the casing 17, as seen in FIGURE 5.

One end of the motor shaft 22 is connected to a 90° gear box 35 which is disposed beyond the casing side 34. A conventional cutter bar 36, of the reciprocating type, is connected to and disposed beneath the bottom front corners of the walls 24 and 25 and is provided at one end with a 90° gear box 37 which is located beyond the wall 25. Gear boxes 35 and 37 are connected by a power takeoff shaft 38 for driving the cutter bar 36 from the motor 21.

A reel 39 is mounted above the forward end of the endless conveyor belt 28, as seen in FIGURES 2 and 3A. Said reel includes a drum 40 having a shaft 41 extending axially therethrough and which is fixed thereto. The ends of the shaft extend through and are journaled in the upper forward corners of the walls 24 and 25 for rotatively supporting the reel on said walls. The reel 39 includes a plurality of arms or spokes 42 which extend radially from the drum 40. Bars 43 are secured to the longitudinally aligned spokes 42 and are spaced radially outwardly from the drum or hub 40.

A belt pulley 44 is fixed to the end of the shaft 30 which projects through the wall 24 and a belt pulley 45 is fixed to the end of the shaft 41 which extends through said wall 24. An endless belt 46 is trained over pulleys 44 and 45 and crosses between said pulleys, as seen in FIGURE 2.

The lower chamber 18 is provided with a deck 47 which is disposed on the frame 13. A beater 48 is mounted in the chamber 18 above and in close proximity to the deck 47 and beneath the upper rear end of the conveyor belt 28, as seen in FIGURE 3. The beater 48 comprises a drum or cylinder 49 having a shaft 50 extending axially therethrough and which is fixed thereto. The ends of the shaft 50 extend through and are journaled in the side walls 33 and 34 (FIGURE 4). Rods 51 are secured to the exterior of the drum 49, extend from end-to-end thereof and are disposed in circumferentially spaced relation to one another, as seen in FIGURES 3 and 8.

The upper chamber 19 houses tanks 52 containing a refrigerant under pressure, such as carbon dioxide. Tanks 52 are connected by conduits 53 to a main supply pipe 54 of a refrigerating unit, designated generally 55, which is mounted in the chamber 18 above the beater 48 and around and behind the upper rear end of the endless conveyor 28, as seen in FIGURES 3 and 5. Refrigerating unit 55 includes manifold pipes 56, 57 and 58 which extend substantially between the walls 33 and 34, and which are connected to communicate with one another and which connect with the main supply pipe 54 through a connection of the pipe 56 therewith. The manifold pipes support a plurality of nozzles 59 which are arranged to be directed toward material being discharged from or about to be discharged from the upper rear end of the upper flight of the conveyor belt 28.

The bottommost portion of the beater 48 is disposed in close proximity to the deck 47. A wall member 60 extends upwardly and rearwardly adjacent the beater 48 and said wall member 60 forms a part of a fan or blower casing 61 which includes a downwardly and rearwardly inclined rear wall 62 which is perforated, as seen in FIGURE 3, and a downwardly and forwardly inclined bottom wall portion 63, a part of the deck 47, and portions of the side walls 33 and 34. The casing 61 contains a rotary-type fan or blower 64 including a hollow hub or drum 65 which is fixed to a shaft 66 which extends centrally therethrough and a plurality of vanes or blades 67 which radiate from the hub 65 and extend lengthwise thereof. Ends of the shaft 66 extend through and are journaled in the walls 33 and 34.

The casing 17 includes a substantially cylindrical portion 68, constituting the rear end thereof, which is disposed crosswise of the machine 12 and which opens into the rear end of the chamber 18, as seen in FIGURE 3. A wall 69 extends downwardly and forwardly at an incline from the lower part of the open front 70 of the chamber 68, and merges with the platform 47. Said wall 69 is disposed beneath, adjacent and substantially parallel to the wall 63. A cutter bar 71 is fixed in the chamber 68 at the bottom of its opening 70 and extends from end-to-end of said chamber. A combination chopper and blower 72 is mounted to rotate in the chamber 68 and includes a drum or hub 73 having a shaft 74 extending centrally therethrough and fixed thereto. The drum has blades 75 projecting from its periphery and which extend longitudinally thereof. The blades 75 are bowed transversely from their inner to their outer edges and all in the same direction. The ends of the shaft 74 extend through and are journaled in the side walls 33 and 34. A stack 76 extends upwardly and rearwardly at an incline from the rear portion of the chamber 68 and is curved at its upper end to discharge rearwardly and downwardly, as seen in FIGURE 2.

A countershaft 77 is suitably journaled in and extends outwardly from the frame 13 on the side 33 of the casing and has belt pulleys 78, 79 and 80 fixed thereto. A belt pulley 81 is fixed to the motor shaft 22 beyond the casing side 33, and an endless belt 82 is trained over the belt pulleys 78 and 81 for connecting the driveshaft 22 to the countershaft 77. A belt pulley 83 is fixed to the shaft 32 outwardly of the side 33 and is connected to the belt pulley 80 by an endless belt 84. Two belt pulleys 85 and 86 are fixed to the shaft 50 on the outer side of the wall 33. An endless belt 87 connects the pulleys 79 and 86 for driving the shaft 50 from the countershaft 77, as seen in FIGURE 1. A belt pulley 88 is fixed to the shaft 66 and is connected to the belt pulley 85 by an endless belt 89. A second belt pulley 90 is fixed to the driveshaft 22, on the inner side of the belt pulley 81. A belt pulley 91 is fixed to the shaft 74 on the outer side of the wall 33, and is connected to the belt pulley 90 by an endless belt 92, the flights of which cross between said pulleys.

As seen in FIGURES 1 and 2, an operator's compartment 93 is supported by the frame 13 in front of the casing 17 and above the wall 24 and includes a seat 94 and a steering wheel 95. The compartment may be reached by a stair or ladder 96. The steering wheel 95 may be connected in any conventional manner to the steering mechanism 16. A manually actuated valve 97 (FIGURE 5) may be provided for shutting off the supply to the manifold from the main pipe line 54, adjacent the manifold 56.

As seen in FIGURE 3A, a double acting hydraulic cylinder 98 may be fastened to the frame 13 and to a member 99 which connects with the walls 24 and 25 to enable said walls to be swung upwardly and downwardly to a limited extent in front of the casing 17 with the endless conveyor 28, and about the shaft 32 as a pivot, for raising and lowering the parts supported by said walls including the cutter bar 36.

Referring to FIGURE 2, the motor shaft 22 revolves in a direction as indicated by the arrow 100 for driving the shaft 77 counterclockwise as indicated by the arrow 101. Accordingly, the shafts 32, 50 and 66 are likewise driven counterclockwise, as indicated by the arrows 102, 103 and 104, respectively. However, the shaft 74 is driven from the shaft 22 in the opposite direction or clockwise, as indicated by the arrow 105. Counterclockwise rotation of the shaft 32 drives the conveyor belt 28 in a direction so that its upper flight travels upwardly and rearwardly, as indicated by the arrow 106 in FIGURE 3A, for driving the lower conveyor shaft 30 counterclockwise, as indicated by the arrow 107 in FIGURE 2. Since the belt 46 is crossed, the reel 39 revolves clockwise, as indicated by the arrow 108. The motor shaft 22 also drives the cutter bar 36 by means of the gearing 35 and 37 and the power takeoff shaft 38.

Accordingly, when the machine 12 is moving in a forward direction, from left to right of FIGURE 1 and 2, through a field containing a forage crop, not shown, the cutter bar 36 will cut the crop growth adjacent the ground level as the machine 12 advances and the cut material will be thrown upwardly and rearwardly by the bars 43 of the revolving reel 39 on to the upwardly and rearwardly travelling upper flight of the conveyor 28. This cut crop material, not shown, will be discharged from the upper rear end of the conveyor 28 into the refrigerating section 109 of the chamber 18, as seen in FIGURES 3 and 5, which is located around and behind the upper rear end of the conveyor 28. Assuming that the valve 97 is open, the refrigerant from the tanks 52 is discharged from the nozzles 59 onto the crop material to effect a quick freezing thereof while it is within the refrigerating section and before it can descend by gravity therefrom onto the beater 48, which is disposed therebeneath and which constitutes a de-icing section 110 of the machine 12. The refrigerant from the nozzle 59 will freeze instantly on the forage material while it is within the refrigerating section 109 to form ice crystals by condensation which will extract moisture from the material and cause it to become very brittle. The frozen plant growth then falls by gravity into the de-icing section 110 and onto the beater 48 which is revolving at a high speed in a counterclockwise direction. Rods 51 of the beater 58 will break off the ice formation on the plant material to thus de-ice the material and to remove most of the moisture therefrom. The plant material will be thrown upwardly and rearwardly over the inclined wall 60 while the ice, not shown, will slide downwardly on the wall 60 onto the deck 47 and will drain from the machine 12, after melting, through the drainage openings 111 (FIGURE 3). Some of the ice from the plants may be thrown by the beater 48 beyond the upper rear end of the inclined wall 60, in which case such ice will drop onto the inclined wall 69 and slide downwardly between said wall and the wall 63 to drain from the machine 12 through the drainage openings 112, after melting.

The fan or blower 64 is of the centrifugal type. The drum or cylinder 65 is made porous or is provided with apertures 113 (FIGURE 6). Said drum has open ends one of which registers with air inlet openings 114 formed in the side wall 34, as seen in FIGURE 3. Air is expelled by the fan 64 through the perforated wall 62 so that the plant material which is thrown rearwardly over the casing 61, by the beater 48, will be blown into the casing 68. The clockwise revolving blades 75 of the chopper-blower 72 will cooperate with the fixed cutter bar 71 for cutting the plant material to a desired degree of fineness, after which the cut and shredded material will be expelled by the chopper-blower from the machine 12 through the stack 76 into a suitable vehicle, not shown, to be conveyed to storage.

If desired, a heating jacket 115, may be disposed under the chamber 68 and connected to a conduit 116 (FIGURE 1) leading from the exhaust manifold of the engine 21 to the jacket 115 for heating the chamber 68 to effect a further drying of the de-moisturized plant material during the chopping operation and before the material is expelled through the stack 76. The jacket 115 is provided with an outlet 117 for the exhaust gases, and the conduit 116 is provided with a branch outlet 118 and a control 119, so that the exhaust may either be discharged to the atmosphere through the branch outlet 118, without entering the jacket 115, or may pass through said jacket and be discharged through the outlet 117, depending upon the position of the valve 119.

From the foregoing, it will be apparent that a machine has been provided by means of which forage crops may be harvested in a single operation by successive uninterrupted steps and prepared for storage as ensilage or wafers without the necessity of leaving the material in windrows for drying before being chopped.

Various modifications and changes are contemplated and may be resorted to without departing from the function or scope of the invention as hereinafter defined by the appended claims.

I claim as my invention:

1. A machine for harvesting alfalfa and other forage crops comprising a mobile frame for movement through a field having a forage crop to be harvested, a casing supported by the frame, refrigerating means for quick freezing the crop material entering the casing for extracting moisture from the material, de-icing means in the casing for separating the ice from the material to effect a de-moisturizing thereof, and a chopper and blower means in the casing for chopping the de-moisturized material to a desired fineness and for expelling the chopped material from the machine.

2. A harvester as in claim 1, said machine having a cutter disposed forwardly of the casing for cutting the growing forage material, and a conveyor forming a part of the machine for receiving the cut material from said cutter, said conveyor having a rear end discharging into said refrigerating means.

3. A harvester as in claim 2, and a revolving reel forming a part of the machine for directing the cut drop material onto the conveyor.

4. A harvester as in claim 1, said refrigerating means including a storage receptacle containing a refrigerant under pressure, conduits leading from such storage receptacle, and a plurality of nozzles connected to said conduits for discharging the refrigerant into the material being harvested as it moves through the casing.

5. A harvester as in claim 1, said de-icing means including a revolving beater disposed beneath the refrigerating means and toward which the frozen crop material descends by gravity from the refrigerating means, said beater forcibly striking the material descending thereon for breaking the ice formation therefrom and for throwing the de-iced material toward said chopper and blower means.

6. A harvester as in claim 1, a fan contained in the casing between the de-icing means and the chopper and blower means for propelling the de-iced material into the chopper and blower means and for cooperating therewith in expelling the chopped material from the machine.

7. A harvester as in claim 6, said de-icer, fan and chopper and blower means each including a rotary unit, an internal combustion engine supported by the machine for driving each of said rotary units, and a heater operated by the exhaust gases from said engine for heating the chopper and blower means for drying the material contained therein.

References Cited

UNITED STATES PATENTS

| | | | |
|---|---|---|---|
| 2,333,850 | 11/1943 | Dunkley | 34—5 |
| 2,513,111 | 6/1950 | Schiller | 56—23 |
| 2,756,554 | 7/1956 | Diehl et al. | 56—1 |
| 3,100,370 | 8/1963 | Blanshine | 56—21 |

HUGH R. CHAMBLEE, *Primary Examiner.*